United States Patent
Watanabe

(10) Patent No.: US 7,590,295 B2
(45) Date of Patent: *Sep. 15, 2009

(54) SEMICONDUCTOR DEVICE AND AN IMAGE PROCESSOR

(75) Inventor: Hiromi Watanabe, Koganei (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/216,361

(22) Filed: Jul. 2, 2008

(65) Prior Publication Data

US 2008/0273805 A1 Nov. 6, 2008

Related U.S. Application Data

(63) Continuation of application No. 11/008,178, filed on Dec. 10, 2004, now Pat. No. 7,412,101.

(30) Foreign Application Priority Data

Dec. 12, 2003 (JP) ............................. 2003-414284

(51) Int. Cl.
*G06K 9/36* (2006.01)
*G06K 9/46* (2006.01)

(52) U.S. Cl. ..................................... 382/234; 382/233

(58) Field of Classification Search ................. 382/232, 382/233, 234, 307
See application file for complete search history.

(56) References Cited

U.S. PATENT DOCUMENTS

| 5,699,460 | A | 12/1997 | Kopet et al. |
| 5,926,208 | A | 7/1999 | Noonen et al. |
| 2001/0038649 | A1 | 11/2001 | Hagai et al. |
| 2002/0041714 | A1 | 4/2002 | Ishida et al. |

FOREIGN PATENT DOCUMENTS

| JP | 09-093577 | 9/1995 |
| JP | 2001-346206 | 3/2001 |
| JP | 2002-171523 | 9/2001 |

*Primary Examiner*—Phuoc Tran
(74) *Attorney, Agent, or Firm*—Stites & Harbison, PLLC; Juan Carlos A. Marquez, Esq.

(57) ABSTRACT

An apparatus for encoding a plurality of image data series and decoding a plurality of encoded image data series includes an interface control circuit for executing data read/write operation from and to a memory area, an encoding/decoding circuit for selectively executing encoding of image data of one series written into the memory area or decoding of encoded image data of one series, and a plurality of registers for giving an instruction of processing to the encoding/decoding circuit wherein the encoding/decoding circuit executes encoding and decoding on a time division basis and in a series unit for image data of a plurality of series in accordance with the instruction from the plurality of registers. The apparatus for executing encoding and decoding of multi-stream image data can be rendered compact in size.

16 Claims, 9 Drawing Sheets

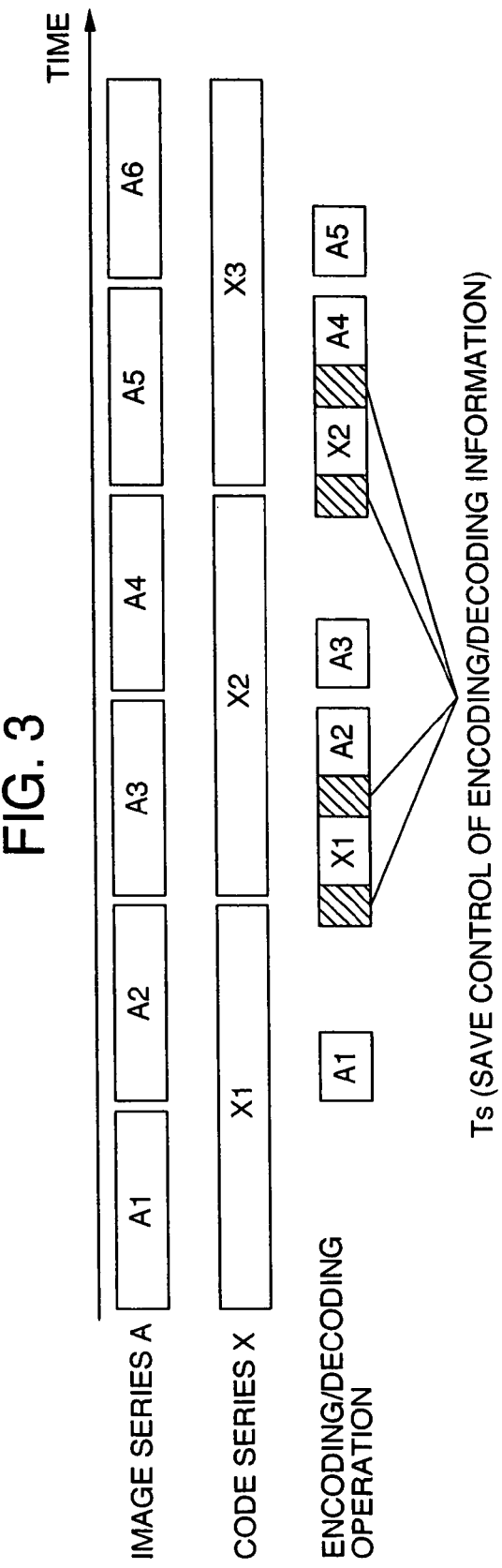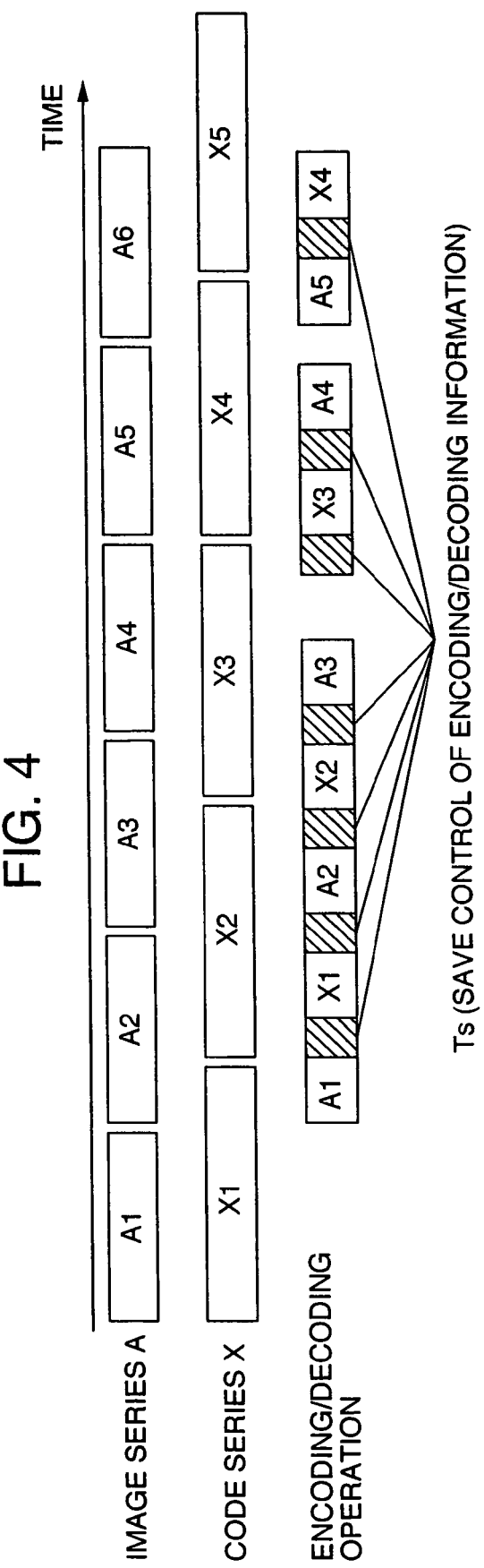

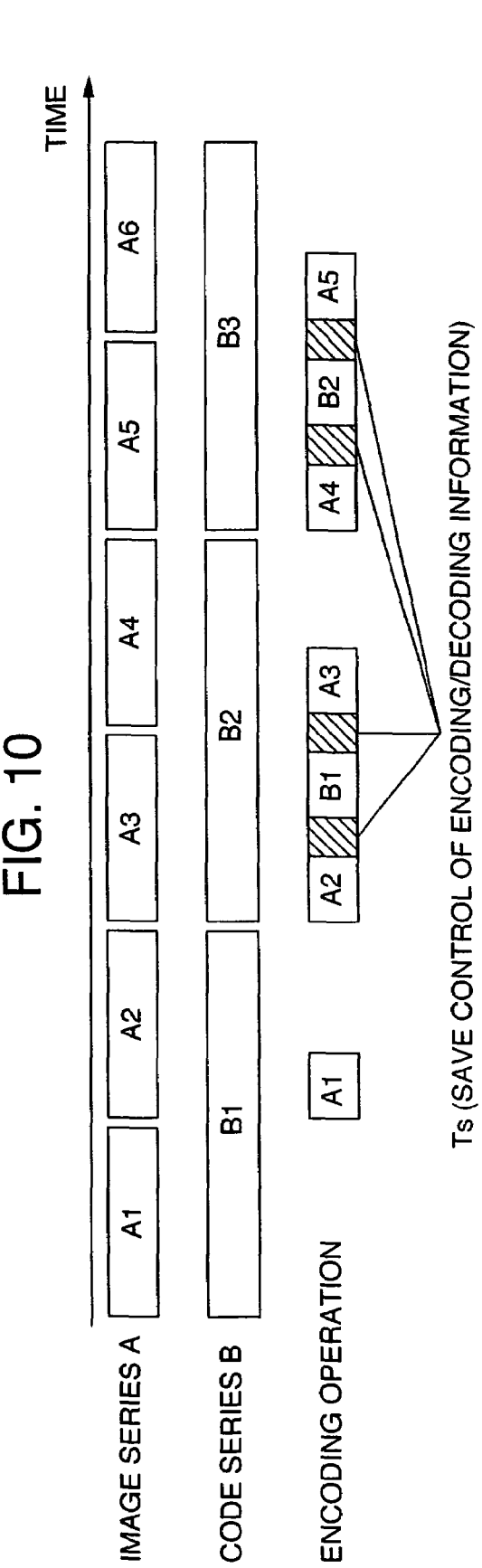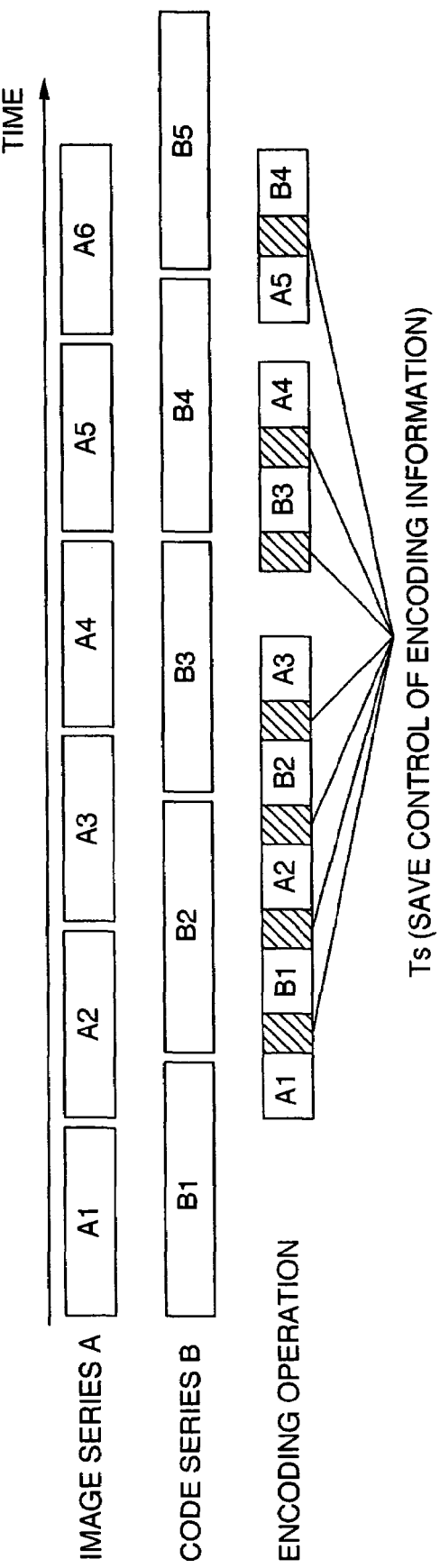

SEMICONDUCTOR DEVICE AND AN IMAGE PROCESSOR

CROSS REFERENCE TO RELATED APPLICATIONS

This application is a Continuation of application Ser. No. 11/008,178 filed Dec. 10, 2004 now U.S. Pat. No. 7,412,101. Priority is claimed based on U.S. application Ser. No. 11/008, 178 filed Dec. 10, 2004, which claims the priority Japanese Application No. 2003-414284, filed on Dec. 12, 2003, all of which is incorporated by reference.

BACKGROUND OF THE INVENTION

This invention relates to an encoding/decoding technology for a plurality of image data series. The invention relates to a technology that will be effective when applied to a processing for multi-streams for displaying both reception image and transmission image on a terminal in a television telephone system, for example.

The International Standard of image signals includes MPEG-4 (ISO14496-2) that handles encoding data of a plurality of image series. The MPEG-4 can decode a plurality of encoded image data series corresponding to a plurality of objects and can synthesize and display them.

To decode the image data of a plurality of image series, the number of decoders corresponding to the number of image series simultaneously handled must be disposed or the number of control registers necessary for simultaneously handling the image series must be disposed in parallel with one another inside one decoder. In either case, the scale of the apparatus is likely to increase. To solve this problem, JP-A-2002-171523 (FIGS. 5 and 8; corresponding to Ishida et al U.S. 2002/0041714A1) provides an image decoder that arranges save areas of decoding information for decoding image data of a plurality of image series, executes a decoding processing by use of a single decoder and can cope with the increase of the number of the image series to be simultaneously decoded through a relatively simple construction.

SUMMARY OF THE INVENTION

In recent mobile terminals typified by cellar telephones, on the other hand, simultaneous operations of encoding and decoding have been required as typically represented by television telephones. When an encoder of one series and a decoder of one series are independently prepared or when a control register for encoding and a control register for decoding are disposed independently and in parallel so as to simultaneously execute encoding and decoding, the apparatus becomes great in scale. When image signals of N series are encoded, for example, N independent image encoders must be prepared. When M compressed image signals are decoded, it is necessary to use M decoders, or to utilize a single decoder on the time division basis as described in the patent document described above (JP-A-2002-171523). To execute encoding of the image signals of the N series and decoding of the image signals of the M series, a construction using N image encoders and M image decoders or the single decoder results in the increase of the scale of the apparatus.

It is an object of the invention to accomplish reduction of a scale of an apparatus for executing encoding of a plurality of image data series and decoding of a plurality of encoded image data series.

It is another object of the invention to accomplish reduction of an apparatus for executing encoding of a plurality of image data series.

The above and other objects and novel features of the invention will become more apparent from the following description of the specification when taken in conjunction with the accompanying drawings.

Several aspects of the invention described above are as follows.

Aspect 1:

A semiconductor device according to the invention from the aspect of an encoding/decoding processing is a semiconductor device for encoding a plurality of image data series and decoding a plurality of encoded image data series, comprising an interface control circuit for executing read/write from and to a memory area; an encoding/decoding circuit for selectively executing encoding of image data of one series written into the memory area or decoding of encoded image data of one series; and a plurality of registers for giving an instruction of processing to the encoding/decoding circuit; wherein the encoding/decoding circuit executes encoding and decoding on a time division basis and in a series unit for image data of a plurality of series in accordance with the instruction given from the plurality of registers.

According to the first aspect described above, encoding and decoding of image data of a plurality of series can be executed on a time division basis by using a single encoding/decoding circuit. The size of an apparatus for encoding and decoding image data of multi-streams can be reduced.

According to a concrete aspect of the invention, the plurality of registers are address registers, and the address register is the one to which an address of a memory area is designated for each series of image data. The memory area is further utilized as an area to which encoding information used for encoding the image data and decoding information used for decoding the compressed image data are saved for each series of the image data. The encoding information and the decoding information include, for example, an image size, a predication encoding method, quantization parameters, characteristics designation information and reference image data used for prediction encoding.

According to a further concrete aspect of the invention, the plurality of registers include a parameter register, an encoding/decoding register, a size register or a type register. The parameter register is a register to which encoding parameters or decoding parameters read out from the memory area designated by the address register are loaded, and which holds the encoding parameters or the decoding parameters written into the memory area designated by the address register. The encoding/decoding register is a register to which encoding/decoding control information instructing as to whether encoding or decoding is to be made for the image data series is set. The size register is a register to which image size information instructing an image size of the image data series to be encoded or decoded to the encoding/decoding circuit is set. The type register is a register to which image type information instructing an image type corresponding to the prediction encoding system to the encoding/decoding circuit is set.

Aspect 2:

An image processor of the invention from the aspect of the encoding/decoding processing is an image processor for encoding a plurality of image data series and decoding a plurality of encoded image data series, comprising a memory and a data processor; the data processor comprising an interface control circuit for executing read/write from and to a memory area of the memory, an encoding/decoding circuit for selectively executing encoding of image data of one series written into the memory area or decoding of encoded image data of one series, and a plurality of registers for giving an instruction of processing to the encoding/decoding circuit. The encoding/decoding circuit executes encoding and decoding on a time division basis and in a series unit for image data of a plurality of series in accordance with the instruction from the plurality of registers.

Both encoding and decoding can be executed for image of a plurality of series on the time division basis by use of a single encoding/decoding circuit in the same way as described above and a compact apparatus for encoding and decoding image data of multi-streams can be accomplished.

Aspect 3:

A semiconductor apparatus of the invention from the aspect of the encoding processing is a semiconductor device for executing encoding for a plurality of image data series, comprising an interface control circuit for executing read/write from and to a memory area; an encoding circuit for executing encoding of image data of one series written into the memory area; and a plurality of registers for giving an instruction of processing to the encoding circuit; wherein the encoding circuit executes encoding on a time division basis and in a series unit for image data of a plurality of series in accordance with the instruction given from the plurality of registers.

According to the third aspect described above, encoding of image data of a plurality of series can be executed on the time division basis by using the single encoding/decoding circuit and a compact apparatus for encoding image data of multi-streams can be accomplished.

According to a concrete aspect of the invention, the plurality of registers include an address register, and the address register is a register to which an address of a memory area is designated for each image data series. The memory area is an area into which encoding information used for encoding the image data is saved for each series of the image data.

According to a further concrete aspect of the invention, the plurality of registers include a parameter register, a size register or a type register. The parameter register is a register to which encoding parameters are loaded from the memory area designated by the address register and which holds encoding parameters to be written into the memory area designated by the address register. The size register is a register to which image size information instructing an image size of the image data series to be encoded to the encoding circuit is set. The type register is a register to which image type information instructing an image type corresponding to a prediction encoding system to the encoding/decoding circuit is set.

Aspect 4:

An image processor of the invention from the aspect of the encoding processing is an image processor for encoding a plurality of image data series, comprising a memory and a data processor. The data processor comprises an interface control circuit for executing read/write from and to a memory area of the memory, an encoding circuit for executing encoding of image data of one series written into the memory area, and a plurality of registers for giving an instruction of processing to the encoding circuit. The encoding circuit executes encoding on a time division basis and in a series unit for image data of a plurality of series in accordance with the instruction given from the plurality of registers.

Encoding of image data of a plurality of series can be executed on the time division basis by using the single encoding/decoding circuit in the same way as described above and a compact apparatus for encoding image data of multi-streams can be accomplished.

Other objects, features and advantages of the invention will become apparent from the following description of the embodiments of the invention taken in conjunction with the accompanying drawings.

BRIEF DESCRIPTION OF THE DRAWINGS

FIG. 3 is a timing chart of an encoding/decoding operation;

FIG. 4 is a timing chart of another encoding/decoding operation;

FIG. 10 is a timing chart of an encoding operation; and

FIG. 11 is another timing chart of the encoding operation.

DESCRIPTION OF THE EMBODIMENTS

Figure 1:
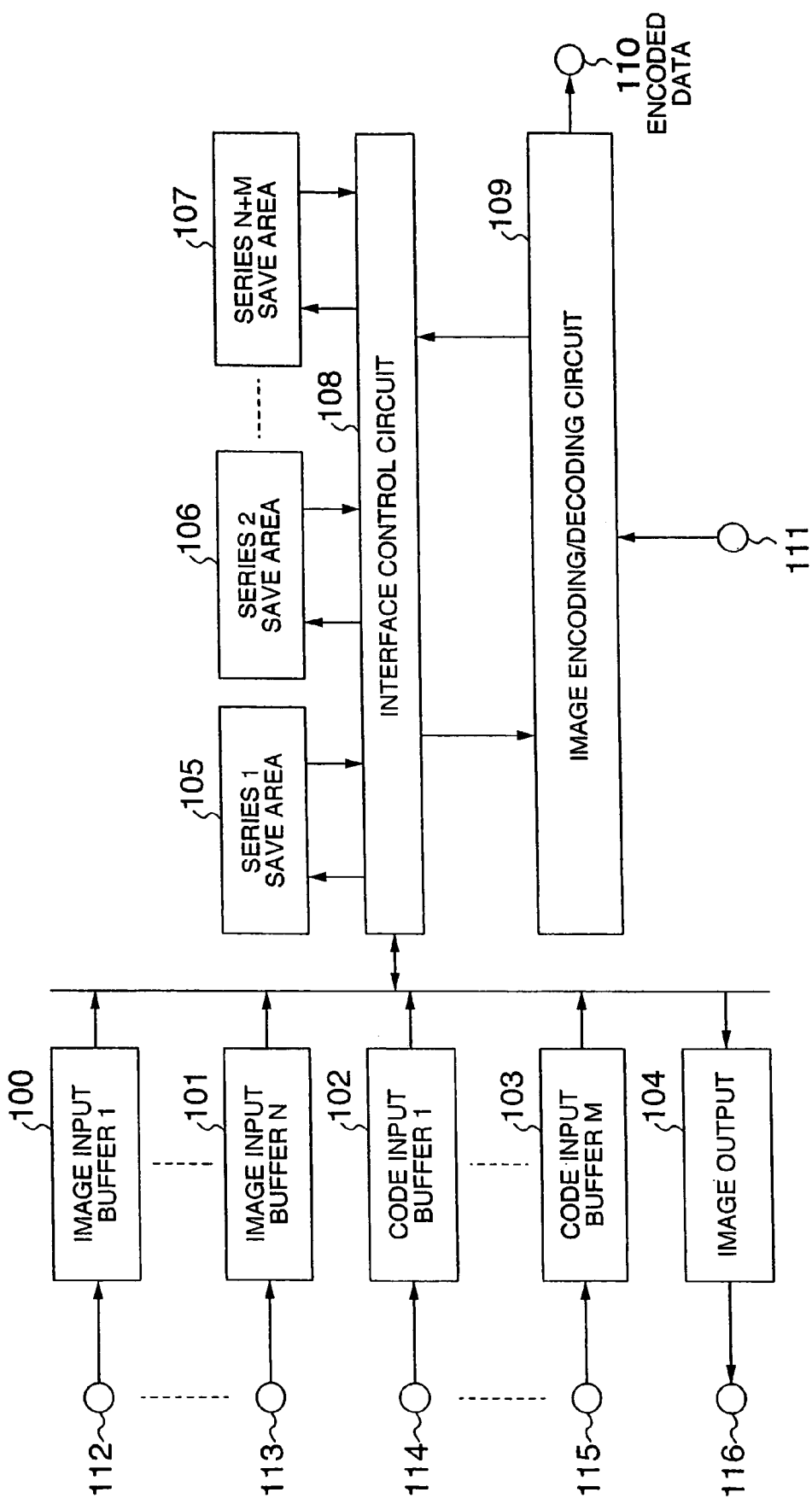
FIG. 1 is a block diagram typically showing an image encoder/decoder as an image processor according to the invention.

FIG. 1 shows an example of an image encoder/decoder as an image processor according to the invention. The image encoder/decoder shown in the drawing executes encoding of image data of a plurality of series such as an N series and decoding of image data of a plurality of series such as an M series as a time division processing conducted by a single encoding/decoding circuit 109. The N series image data (image series) are inputted from ports 112 and 113 that are typically shown. The image data so inputted are temporarily stored in image input buffers 100 and 101 and are then transferred to corresponding save areas inside save areas 105, 106 and 107. Encoded image data series (code series) are inputted from ports 114 and 115 typically shown in the drawings and are then transferred from code input buffers 102 and 103 to corresponding save areas inside the save areas 105, 106 and 107. Necessary image data are transferred from suitable areas inside the save areas 105, 106 and 107 to an image output buffer 104 and the image data so transferred are outputted from a data port 116 for image display. An instruction representing the image signals of which series are to be encoded or which encoded series are to be decoded is given from the port 111 to the image encoding/decoding circuit 109. The image data or the encoded image data in the save area instructed from the port 111 are supplied to the image encoding/decoding circuit 109. The image encoding/decoding circuit 109 encodes the image data and outputs the image data from the port 110, or decodes the image data and stores the decoded image data in the necessary save area. The image data so stored are outputted at a necessary timing as the image signals through the image output buffer 104. When the instruction from the port 11 changes from the image series to the code series, encoding information in the image encoding/decoding circuit 109 that will be necessary for the re-start of the encoding processing next to the series now under the encoding processing is transferred to the corresponding save area of that series through the interface control circuit 108. Next, decoding information corresponding to the code series in the save area is supplied to the image encoding/decoding circuit 109 under control of the interface control circuit 108. The image encoding/decoding circuit 109 executes decoding of the code series by utilizing the decoding information acquired.

Figure 2:
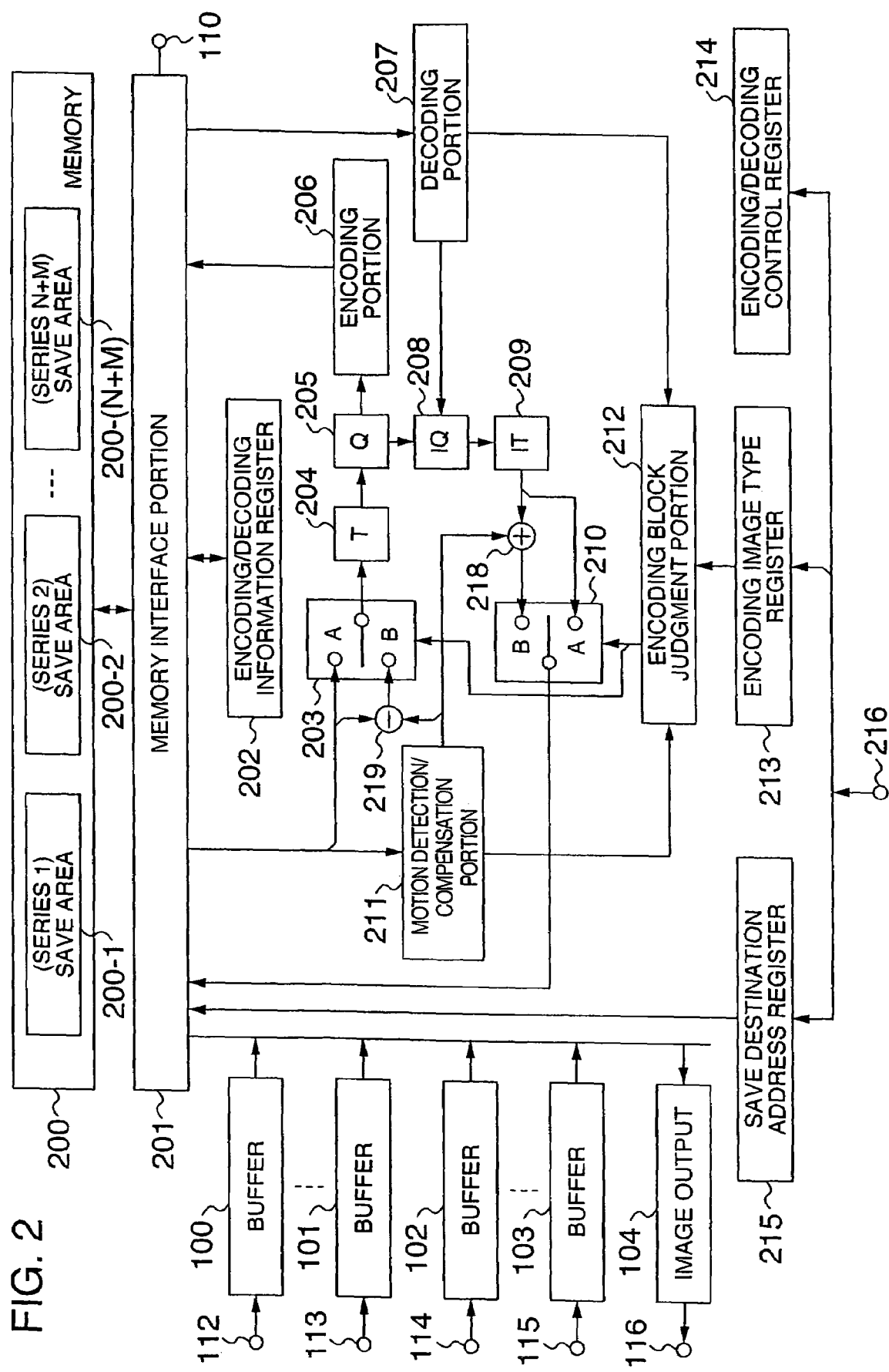
FIG. 2 is a block diagram showing in further detail a construction of the image encoder/decoder.

FIG. 2 shows in further detail the construction of the image encoding/decoding apparatus. The save areas 200-1 to 200-(N+M) have a memory 200 such as a DRAM. The interface control circuit 108 includes a memory interface portion 201. The image encoding/decoding circuit 109 includes an encoding/decoding information register 202, a selector 203, a conversion logic block (T) 204 for executing a conversion processing such as DCT, a quantization portion (Q), an encoding portion 206 for encoding the quantized data in a predetermined format, an inverse quantization portion (IQ) 208, an inverse transformation logic block (IT) 209 for executing inverse conversion such as inverse DCT, a motion detection/compensation portion 211, a selector 210, an encoding block judgment portion 212, an encoding image type register 213, an encoding/decoding control register 214, a save address register 215, an adder 218 and a subtracter 219.

The encoding/decoding operation in the construction shown in FIG. 2 will be explained. The image data of the N series are inputted from the ports 112 and 113 and are transferred to the predetermined save areas of the memory 200 through the buffers 100 and 101. The encoded image data of the M series are inputted from the port 114 and 115 and are transferred to the predetermined save areas of the memory 200 through the buffers 102 and 103. The save destination address representing the save area storing the series for which encoding is to be executed or decoding is to be executed is set to the save destination address register 215 and the control information (encoding/decoding control information) for controlling whether encoding of the image series or decoding of the code series is to be executed is set to the encoding/decoding control register 214. The size data of the image is set as the encoding/decoding control information to the encoding/decoding control register 214. Furthermore, when the image is encoded, information (encoding image type information) indicating that the image is encoded to an I picture and a P picture used in MPEG, for example, is set to the encoding image type register 213.

Assuming that the set instruction for encoding the image data of the series 1 by the I picture is given from the port 216, the memory interface portion 201 acquires the image data from the save area 2001-1 of the series 1 in accordance with the processing procedure and supplies the image data from the port A of the selector 203 to the conversion logic block 204. The conversion logic block 204 executes the conversion processing such as DCT for the input data and the data after this conversion processing is supplied to the quantization portion 205 and is quantized. The quantized data is encoded by the encoding portion 206 and is outputted from the port 110 through the memory interface portion 201. The output of the quantization portion 205 is inversely quantized by the inverse quantization portion 208. After the inverse quantization, the data is subjected to inverse conversion such as inverse DCT in the inverse conversion logic block 209 and is written as the reference image for subsequent processing in the save area 2001-1 of the series 1 from the port B of the selector 210 through the memory interface portion 201. Information that is utilized during the encoding operation such as the quantization information, the image size necessary for subsequent encoding, encoding parameters such as an encoding method, and so forth, remains in the encoding/decoding information register 202.

Next, it will be assumed that the save destination address is set to the register 215 so that the encoding image data of the series M can be decoded at the port 216 and the encoding/decoding information is set to the register 214. The encoding information remaining in the encoding/decoding information register 202 of the image series 1 is saved into the save area 200-1 of the series 1 through the memory interface portion 201. Next, the decoding parameters used for decoding of the code series ahead of the code series M are again read from the save area 200-(N+M) to the encoding/decoding information register 202 and the decoding operation is started. The decoding parameters include the information such as the quantization information, the image size, the encoding method, and so forth. First, the decoding portion 207 decodes the encoding image data existing in the save area 200-(N+M). Inverse quantization by the inverse quantization portion 208, inverse DCT conversion by the inverse conversion logic block 209 and addition with the block information obtained by the motion detection compensation portion 211 when the object block is inter-frame information are carried out and the processing result is stored as the image signals in the save area 200-(N+M) of the code series M from the port B of the selector 210 through the memory interface portion 201. When the information is the information inside the frame, the information is stored as the image signals in the save area 200-(N+M) of the code series M from the port A of the selector 210 through the memory interface portion 201. The image signals stored are outputted as the image output from the port 116 through the image output buffer 104.

FIG. 3 typically shows a timing chart of the encoding/decoding operation described above. Here, the image series are image series (image data series) A and the code series (encoded image data series) X, the image series are stored in a frame unit in the save area for each series in the order of A1, A2 and so on and the code series are stored in the save area for each series in the order of X1, X2 and so on. It will be assumed that the instruction of the encoding/decoding operation is set from the port 216. First, when the image data A1 is acquired, encoding of the image data A1 is executed. At this time, acquisition of the image data X1 is not yet completed. Next, when the image data A2 is acquired, decoding of the image data X1 is executed and encoding of the image data A2 is executed because the image data X1 has already been acquired. Since encoding of the image data A1, decoding of the image data X1 and encoding of the image data A2 are executed in this case, the encoding parameters of the image data A1 are saved before decoding of the image data X1 and the encoding parameters of the image data A1 are again read. The save processing is illustrated as Ts in FIG. 3.

FIG. 4 shows another example of the timing chart of the encoding/decoding operation where the timing of the image series is different from that of FIG. 3. It will be assumed that the instruction of the encoding/decoding operation is set from the port 216. First, when the image data A1 is acquired into the save area, encoding of the image data A1 is executed. Since acquisition of the image data X1 into the save area has already been completed at this time, the image data A1 is next acquired into the corresponding save area and encoding of the image data X1 is executed. Since the image series changes from the series A to the series B in this case, saving of the encoding parameters of the series A must be executed.

Figure 5:
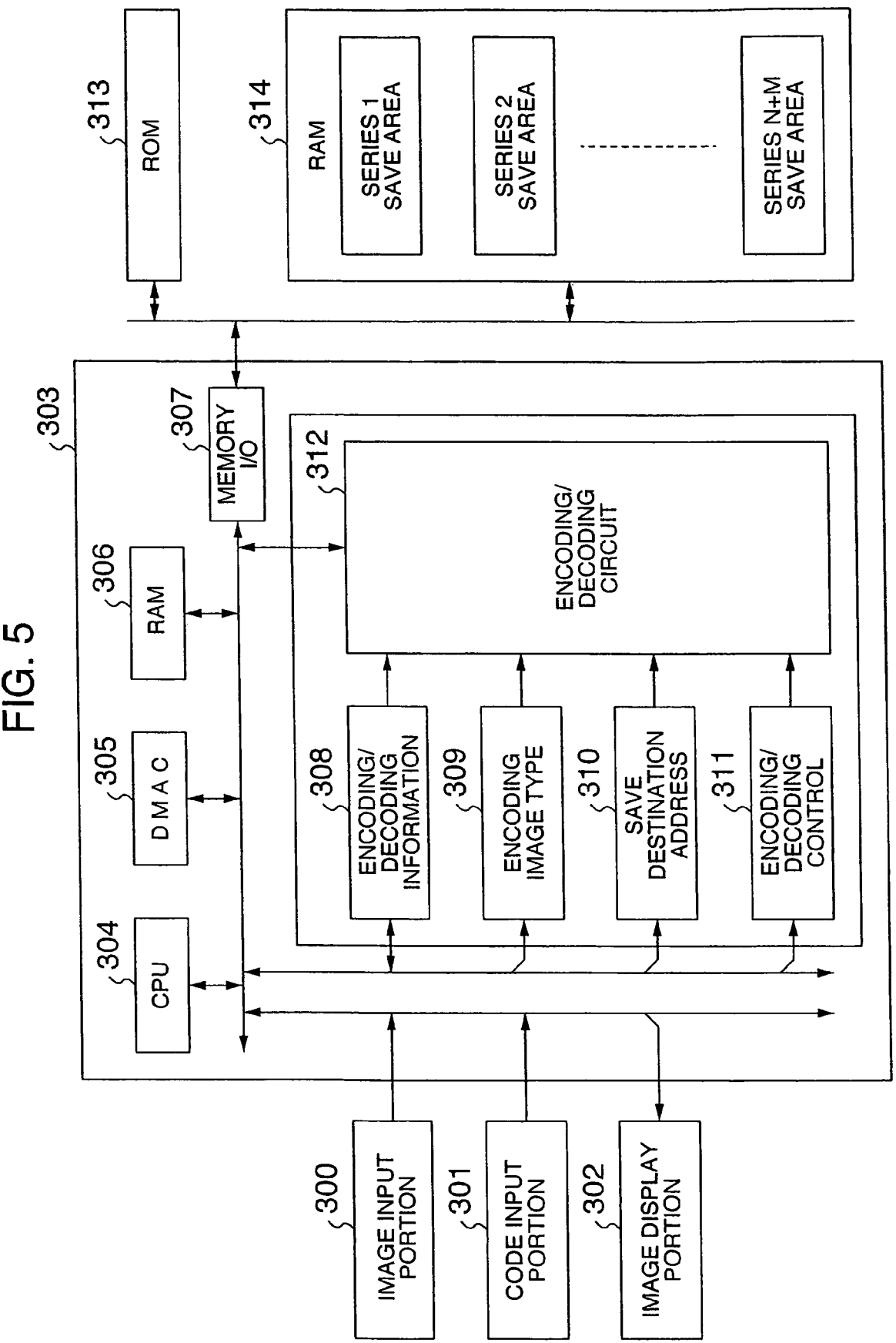
FIG. 5 is a block diagram when the image encoder/decoder shown in FIG. 2 is constituted by a data processor and a memory.

FIG. 5 shows a block diagram when the image encoding/decoding apparatus is constituted by a data processor and a memory. The memory includes an ROM 313 and an RAM 314. The ROM 313 stores an operation program of the data processor 303. The RAM 314 is used for the save area and the like. This example employs a construction in which setting to the port 13 or the port 216 is made as a CPU 304 of the data processor 303 executes software. The data processor 303, the ROM 313 and the RAM 314 are not particularly limited but are constituted by using a discrete semiconductor chip. The ROM 313 is a mask ROM or an electrically rewritable flash memory. The RAM 314 is a clock synchronization type synchronous DRAM (dynamic random access memory) or a synchronous SRAM (static random access memory).

The data processor 303 has a CPU (central processing unit) 304, a DMAC (direct memory access controller) 305, an RAM 306, a memory I/O 307, an encoding/decoding information register 308, an encoding image type setting register 309, a save destination address register 310, an encoding/decoding control register 311, an encoding/decoding circuit 312, and so forth. The program is stored in an external ROM 313 or an internal RAM 306. The save areas are allocated to the external RAM 314. The image signal inputted from the image input portion 300 is stored in a suitable save area through the memory I/O 307. The CPU 304 detects these image data of the image series or of the code series that are inputted by an interrupt signal, etc, and decides encoding of the image data of which series is to be next executed or decoding of which code series is to be next executed for the encoding/decoding circuit 312 and executes setting of the save destination address register 310 and the encoding/decoding control register 311. When switch of encoding and decoding occurs or when the image signal series or the code series is different in this case, the encoding/decoding parameters are saved in a suitable save area from the encoding/decoding information register 308 by utilizing the function of the DMAC 305. The encoding/decoding circuit 312 and the registers 308 to 311 correspond to the image encoding/decoding circuit 109 described already. The encoding/decoding circuit 312 is the circuit that selectively executes encoding of the image data of one series written into the save area or decoding of the encoded image data of one series. The registers 308 to 311 are a set of registers provided to the encoding/decoding circuit 312. In short, a plurality of registers having the same function is not disposed in parallel for different image series. When the image series to be processed are different, the encoding/decoding parameters now used are saved from the register 308 to the corresponding save area and encoding/decoding parameters for a new image series switched is loaded from the corresponding save area to the register 308.

Figure 6:
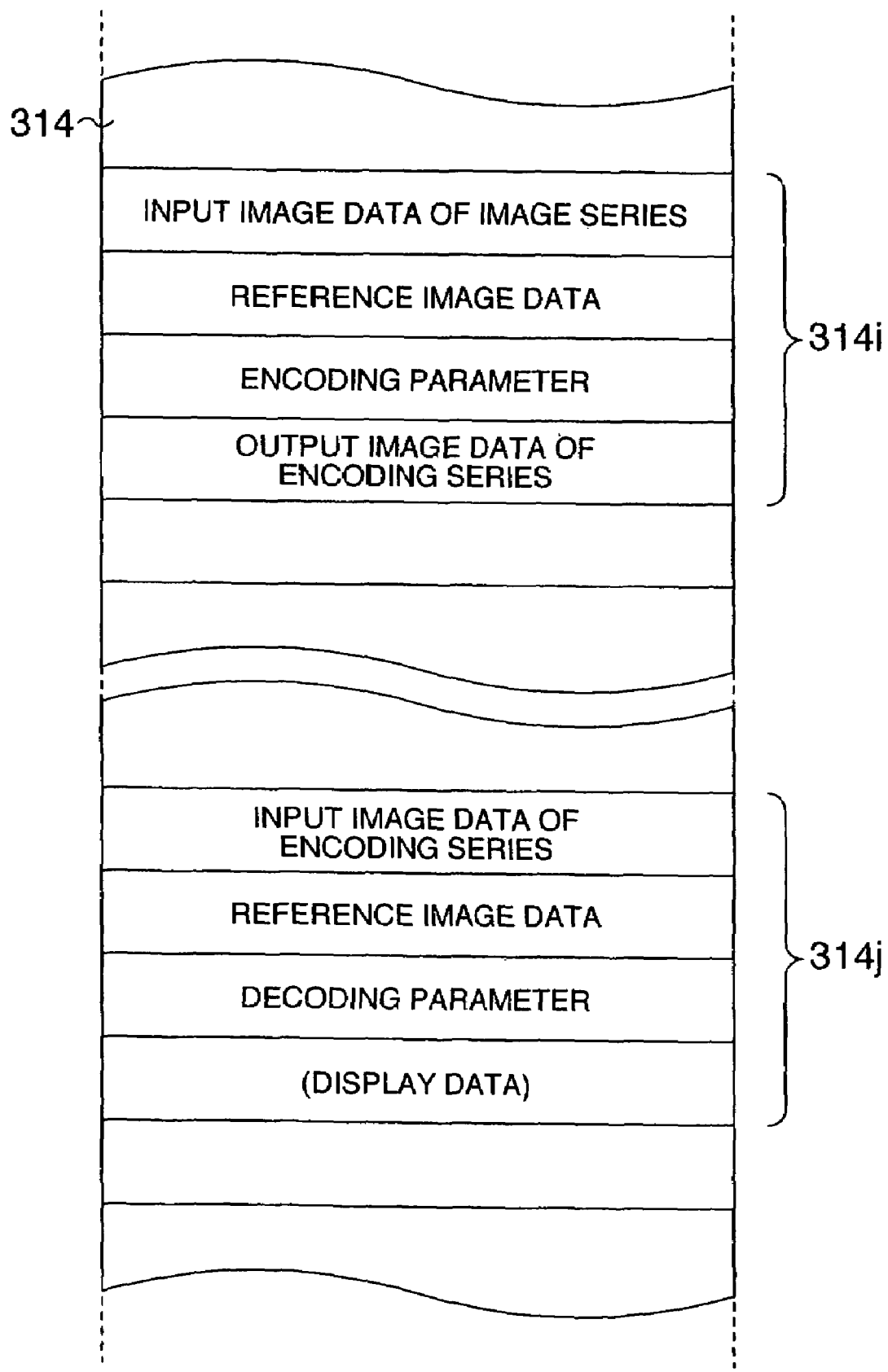
FIG. 6 typically shows memory information of a save area.

FIG. 6 typically shows the storage information of the save area. Areas for storing input image data of the image series, reference image data, encoding parameters and output image data of the encoding series are allocated to a save area 314i for encoding. Areas for storing input image data of the code series, reference image data, decoding parameters and display data of the encoding series are allocated to a save area 314j for decoding. The display data can be replaced by the reference data. The encoding parameters and the decoding parameters belong to the category of the encoding/decoding parameters that are stored and loaded from and to the register 308.

Figure 7:
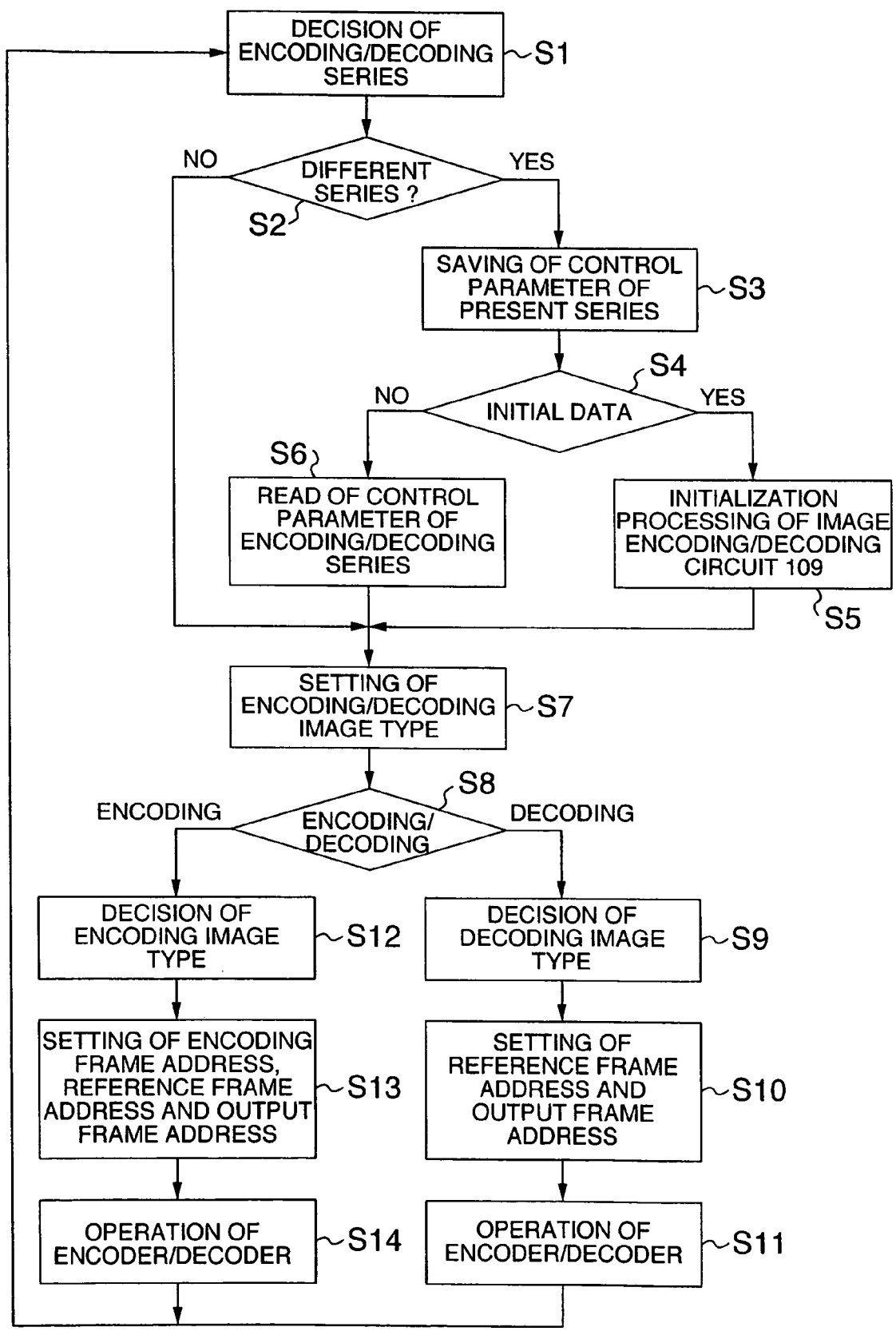
FIG. 7 is a flowchart typically showing a procedure of an encoding/decoding processing.

FIG. 7 typically shows a control procedure of the encoding/decoding processing by the CPU. When a new encoding/decoding series to be processed is decided (S1), whether this encoding/decoding series is different from the present processing series is judged (S2). When it is different, the control parameters of the present series are saved into the corresponding save area (S3) and whether or not the initial data is necessary as the control parameters for the new encoding/decoding series is judged (S4). When the initial data is judged as necessary (when the processing for this encoding/decoding series is to be made for the first time), an initialization processing of the image encoding/decoding circuit 109 is executed (S5). When the initial data is not necessary, the control parameters for the new encoding/decoding series are read from the save area (S6). Whether the kind of the processing is encoding or decoding is thereafter judged (S8). When the processing is the decoding processing, the decoding image type is decided (S9), setting of the reference frame address and the output frame address is made (S10) and finally, the encoding/decoding circuit 109 is operated (S11). When the judgment result of the step S8 is encoding, the encoding/decoding image type is decided (S12), setting of the encoding frame address, the reference frame address and the output frame address is made (S13) and finally, the encoding/decoding circuit 109 is operated (S14).

Figure 8:
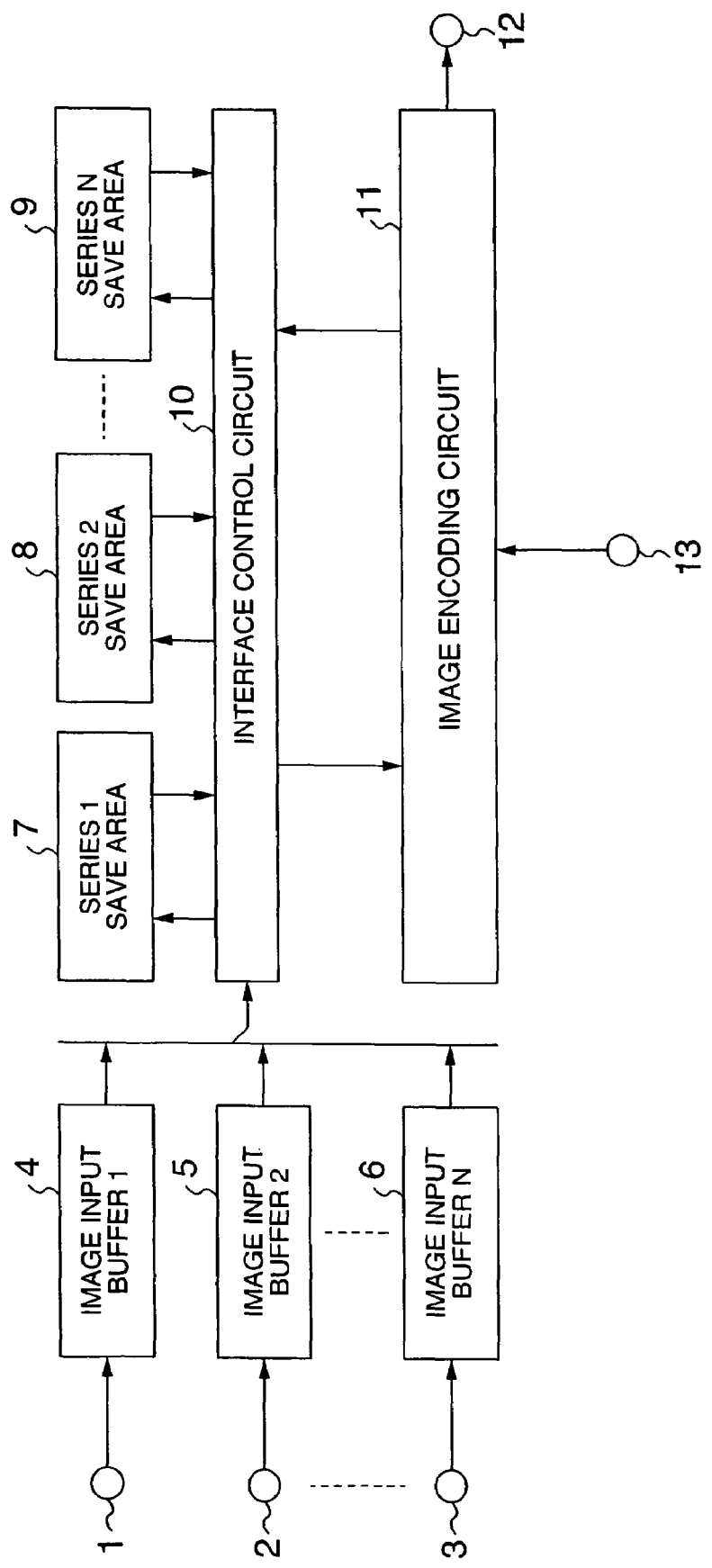
FIG. 8 is a block diagram typically showing an image encoder as an image processor according to the invention.

FIG. 8 shows an example of the image encoder as the image processor according to the invention. In the image encoder shown in the drawing, image data of a plurality of series such as an N series are inputted from ports indicated by reference numerals 1, 2 and 3. The image data so inputted are temporarily stored in image input buffers 4, 5 and 6 and are then transferred to save areas 7, 8 and 9 as the memory areas. The image input buffers 4, 5 and 6 are buffer areas for transferring at a good timing the image data of the N series to the save areas 7, 8 and 9 and their capacities may well be decided in such a manner as to acquire necessary buffer functions. An interface control circuit 10 controls read/write from and to the save areas 7, 8 and 9.

An instruction as to the image data of which series are to be encoded is given from the port 13 to the image encoding circuit 11. The image encoding circuit 11 encodes the image data in the save area indicated by the port 13 and outputs the encoded data to the port 12. In this instance, the image encoding circuit 11 executes the encoding processing by utilizing the save area of the indicated series. When the series of the image data indicated from the port 13 changes, the encoding parameters that will be necessary when the next processing of the series now subjected to the encoding processing in the image encoding circuit 11 are transferred to the save area of the series through the interface control circuit 10. The encoding parameters of the save area indicated from the port 13 are acquired into the image encoding circuit 11 under control of the interface control circuit 10. The image encoding circuit 11 executes the encoding processing of the image data so acquired.

Figure 9:
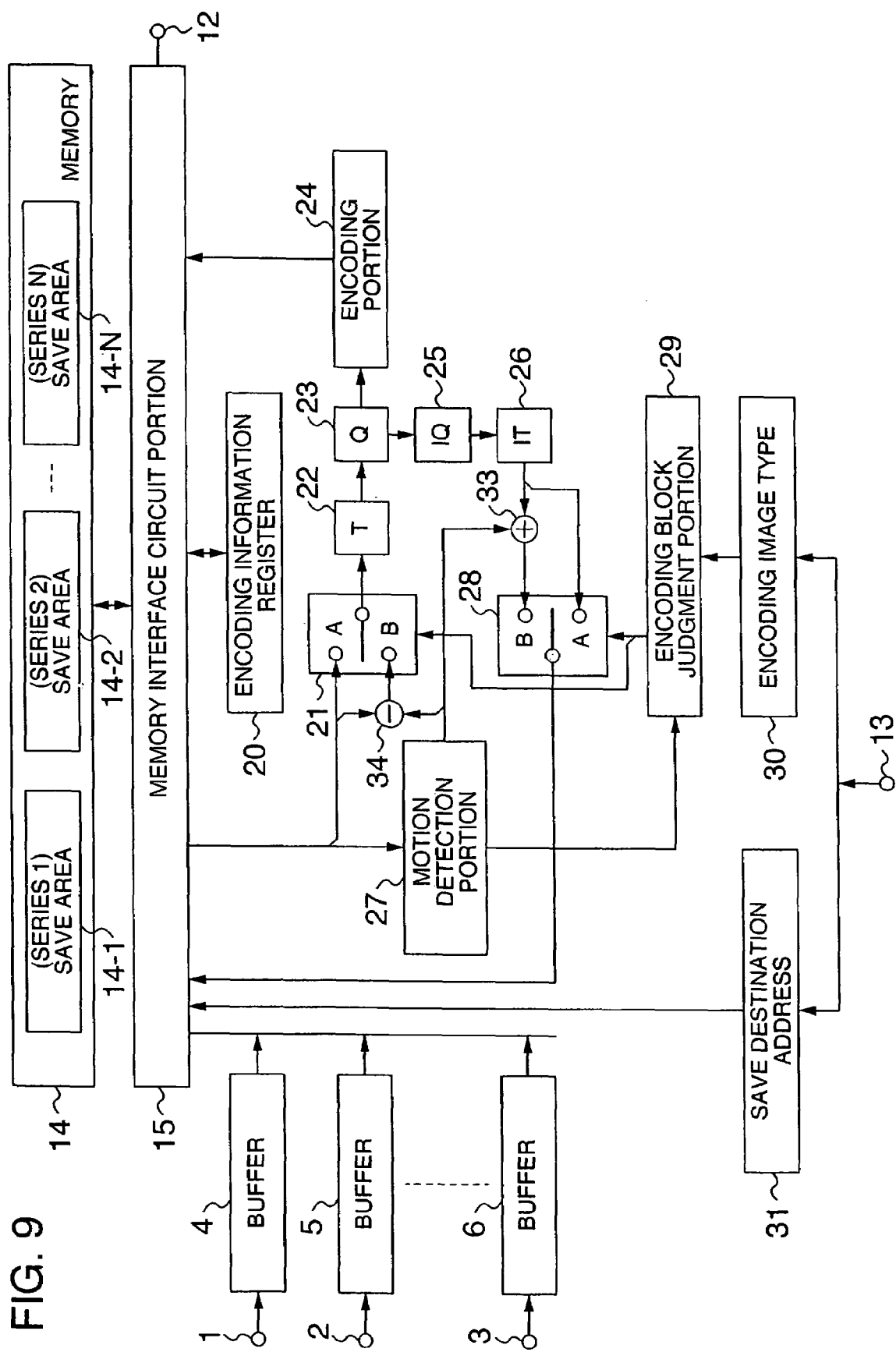
FIG. 9 is a block diagram typically showing in further detail a construction of the image encoder/decoder shown in FIG. 8.

FIG. 9 shows in further detail the construction of the image encoder. The save area is constituted by a memory 14 such as a DRAM. The image encoding circuit 11 described above includes an encoding information register 20, a selector 21, a conversion logic block (T) 22 for executing a conversion processing such as DCT, a quantization portion (Q) 23, an encoding portion 24 for encoding the quantized data in a predetermined format, an inverse quantization portion 25, an inverse conversion logic block (IT) 26 for executing inverse conversion such as inverse DCT, a motion detection/compensation portion 27, a selector 28, an encoding block judgment portion 29, an encoding image type register 30, a save destination address register 31, an adder 33 and a subtracter 34.

The encoding operation in the construction shown in FIG. 9 will be explained. The image data of the N series are inputted from the ports 1, 2 and 3 and are transferred to positions of a predetermined series of the save areas 14-1 to 14-N of the memory 14 through the buffers 4, 5 and 6. The memory interface circuit 15 executes transfer control. The save destination address representing the storage position of the series for which encoding is executed is set from the port 13 to the save destination address register 31. The encoding image type information is set to the encoding image type register 30. The encoding image type information is the information that indicates that the image is encoded to I picture and P picture used in MPEG, for example. Assuming hereby that the instruction representing that the image data of the series 1 are to be encoded by the I picture is inputted from the port 13, the memory interface circuit 15 acquires the image data from the save area 14-1 of the series 1 and supplies the data to the conversion logic block 22 from the port A of the selector 21. The conversion logic block 22 executes the conversion processing such as DCT. The data after this conversion processing are quantized by the quantization portion 23 and are encoded by the encoding portion 24 in the predetermined format. The encoded image data is outputted as the codes (encoded data) from the port 12 through the memory interface circuit 15. The output of the quantization portion 23 is inputted to the inverse quantization portion 25 and is inversely converted by the inverse conversion logic block 26 such as an inverse DCT. The data inversely converted is written as the reference image for the subsequent prediction encoding processing from the port A of the selector 28 into the save area 14-1 of the series 1 through the memory interface circuit 15. The encoding parameters utilized during the encoding operation of the image data of the series 1 such as the quantization information, the image size necessary for subsequent encoding, the encoding method, and so forth, remain in the encoding information register 20.

Next, it will be assumed that the address of the image data of the series 2 is set from the port 13 to the save destination address register 31 so as to encode the image data of the series 2 and that an instruction to encode the image data by the ordinary P picture such as MPEG is set to the encoding image type register 30. In this case, it will be assumed further that since the image data are encoded by the P picture, the information previously encoded and the reference image exist in the save area 14-2 of the series 2. First, the encoding parameters utilized for the processing of the present series 1 are temporarily saved from the encoding information register 20 into the save area 14-1 of the series 1 through the memory interface circuit 15. The encoding parameters that have been saved in the series 2 are written into the encoding information register 20 through the memory interface circuit 15. Next, the image data to be encoded and the reference image data in the save area 14-2 of the series 2 are read out and the motion detection portion 27 executes the motion detection processing. The subtracter 34 calculates the difference data with respect to the reference data for the block for which the encoding block judgment portion 29 judges that encoding of the difference value is to be executed. The difference value is inputted from the port B of the selector 21 and the conversion logic block 22 executes DCT conversion of the difference. The quantization portion 23 executes quantization, the encoding portion 24 executes encoding and the result is outputted from the port 12 through the memory interface circuit 15. The output of the quantization portion 23 is inversely quantized by the inverse quantization portion 25 and is subjected to inverse DCT conversion by the inverse conversion logic block 26. The adder 33 adds the reference image on the save area 14-2 of the series 2 to the data inversely converted and the sum data is stored as a new reference image in the save area 14-2 of the series 2 from the port B of the selector 28 through the memory interface circuit 15. The encoding information utilized during the encoding operation of the image data of the series 2 such as the quantization information, the image size that will be necessary for subsequent encoding, the encoding method, and so forth, remain in the encoding information register 20.

FIG. 10 typically shows a timing chart of the encoding operation described above. It will be assumed hereby that image series A and B exist and each image series serially stores the image data in one frame unit in each save area as indicated by A1, A2, and so on and B1, B2, and so on. Instruction of the encoding operation is set from the port 13. First, when the image data A1 is acquired into the save area, encoding of the image data A1 is executed. At this time, acquisition of the image data into the corresponding save area is not yet finished. Next, when the image data A2 is acquired into the corresponding save area, encoding of the image data A2 is executed. Since the encoding series does not change in this case, the encoding parameters need not be saved. Because acquisition of the image data B1 has been finished in this stage, an instruction is given from the port 13 so that the image data B1 should be encoded after encoding of the image data A2. Since the image series changes from the series A to the series B, saving of the encoding parameters of the series A must be executed. After saving is executed, encoding of the image data B1 is executed. Next, the encoding parameters of the series B are saved to encode the image data A3 of the series A, the encoding information used in encoding of the image A2 is read again and the image data A3 are encoded. The save processing is indicated by Ts in FIG. 10.

FIG. 11 shows an example of a timing chart of the encoding operation that has a different timing of the image series from FIG. 10. It will be assumed that the instruction of the encoding operation is set from the port 13. First, when the image data A1 is acquired into the save area, encoding of the image data A1 is executed. At this time, the image data B1 has already been acquired into the save area. Therefore, the image data B1 is acquired into the corresponding save area and encoding of the image data B2 is executed. In this case, the encoding parameters of the series A must be saved because the image series changes from the series A to the series B.

The invention completed by the inventor has thus been explained concretely with reference to the embodiment thereof but is not particularly limited thereto. Needless to say, the invention can be changed or modified in various ways without departing from its scope.

For example, the memory typified by the RAM 314 to which the save areas are allocated may be mounted as on-chip to the data processor as the semiconductor device. The invention is not limited to the application to the cellular telephones and the television telephones but can be broadly applied to other image processors for executing the encoding/decoding processing for multi-streams.

The advantageous effects brought forth by the typical invention among those disclosed in this application are briefly as follows.

Reduction of the scale of the apparatus for encoding a plurality of image data series and decoding a plurality of encoded image data series can be achieved. Reduction of the scale of the apparatus for encoding a plurality of image data series can be achieved. Consequently, the semiconductor device for executing the processing described above and the image processor can be rendered economical.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processor on a chip for use with a memory and for encoding a first series of image data and decoding a second series of encoded image data for multi-streams, the data processor comprising:
   a central processing unit;
   a direct memory access controller,
   a first port for inputting the first series of image data;
   a second port for inputting the second series of encoded image data;
   an interface for data read/write operation from and to a memory area of the memory;
   an encoding/decoding circuit which selectively performs encoding of the first series of image data written into the memory area and decoding of the second series of encoded image data; and
   a plurality of registers which provide an instruction of processing to the encoding/decoding circuit,
   wherein the encoding/decoding circuit performs encoding of the first series of image data and decoding of the second series of encoded image data on a time division basis in each series in accordance with the instruction from the plurality of registers.

2. A data processor according to claim 1,
   wherein the plurality of registers include an address register to which an address of a memory area is designated for each of the first series of image data and the second series of encoded image data.

3. A data processor according to claim 2,
   wherein the plurality of registers include a parameter register to which encoding parameters are loaded from the memory area designated by the address register, the parameter register holding encoding parameters to be written into the memory area designated by the address register.

4. A data processor according to claim 1,
   wherein the plurality of registers include a size register, and the size register is a register to which image size information instructing an image size of the image data series to be encoded to the encoding circuit is set.

5. A data processor according to claim 1,
   wherein the plurality of registers include a type register, and the type register is a register to which image type information instructing to the encoding/decoding circuit an image type corresponding to a prediction encoding system is set.

6. A semiconductor data processor for a cellular telephone, the semiconductor data processor being for use with a synchronous dynamic random access memory and for encoding a first series of image data and decoding a second series of encoded image data for multi-streams, the semiconductor data processor comprising:
   a central processing unit;
   a direct memory access controller;
   a first port for inputting the first series of image data;
   a second port for inputting the second series of encoded image data;
   an output port for outputting an image data;
   an interface for data read/write operation from and to a memory area of the synchronous dynamic random access memory;
   an encoding/decoding circuit which selectively performs encoding of the first series of image data written into the memory area and decoding of the second series of encoded image data; and
   a plurality of registers which provide an instruction of processing to the encoding/decoding circuit,
   wherein the encoding/decoding circuit performs encoding of the first series of image data and decoding of the second series of encoded image data on a time division basis in each series in accordance with the instruction from the plurality of registers.

7. A semiconductor data processor according to claim 6,
   wherein the plurality of registers include an address register, and the address register is a register to which an address of a memory area is designated for each of the first series of image data and the second series of encoded image data.

8. A semiconductor data processor according to claim 7,
   wherein the plurality of registers include a parameter register, and the parameter register is a register to which encoding parameters are loaded from the memory area designated by the address register, the parameter register holding encoding parameters to be written into the memory area designated by the address register.

9. A semiconductor data processor according to claim 6,
   wherein the plurality of registers include a size register, and the size register is a register to which image size information instructing an image size of the image data series to be encoded is set to the encoding circuit.

10. A semiconductor data processor according to claim 6,
    wherein the plurality of registers include a type register, and the type register is a register to which image type information instructing to the encoding/decoding circuit an image type corresponding to a prediction encoding system is set.

11. A data processor on a semiconductor chip for a television telephone, the data processor being for use with a synchronous dynamic random access memory and for encoding a first series of image data and decoding a second series of encoded image data for multi-streams, the data processor comprising:
    a central processing unit;
    a direct memory access controller;
    a first port for inputting the first series of image data;
    an output port for outputting an image data;
    a second port for inputting the second series of encoded image data;
    an interface for data read/write operation from and to a memory area of the synchronous dynamic random access memory;
    an encoding/decoding circuit which selectively performs encoding of the first series of image data written into the memory area and decoding of the second series of encoded image data; and
    a plurality of registers which provide an instruction of processing to the encoding/decoding circuit,
    wherein the encoding/decoding circuit performs encoding of the first series of image data and decoding of the second series of encoded image data on a time division basis in each series in accordance with the instruction from the plurality of registers, and
    wherein the plurality of registers include:
    an address register to which an address of a memory area is designated for each of the first series of image data and the second series of encoded image data,
    a parameter register to which encoding parameters are loaded from the memory area designated by the address register, the encoding parameter holding parameters to be written into the memory area designated by the address register,
    a size register to which image size information instructing an image size of the image data series to be encoded is set to the encoding circuit, and a type register to which image type information instructing an image type corresponding to a prediction encoding system to the encoding/decoding circuit is set.

12. A data processor according to claim 3, wherein the plurality of registers include an encoding/decoding register, and the encoding/decoding register is a register to which encoding/decoding control information instruction as to whether encoding or decoding is to be made for the image data series is set.

13. A data processor according to claim 1, wherein the memory is used as an area in which the plurality of image data, the plurality of encoded image data, encoding information used for encoding the plurality of image data series and decoding information used for decoding the plurality of encoded image data series are saved.

14. A data processor according to claim 13, wherein encoding information which is necessary for restarting next encoding processing is saved in the memory and the decoding information is supplied from the memory to the encoding/decoding circuit when the instruction is changed from an image series to an encoded image series.

15. A semiconductor device for encoding a plurality of image data series and decoding a plurality of encoded image data series, comprising:

a memory used as an area to which the plurality of image data, the plurality of encoded image data, encoding information used for encoding the plurality of image data series and decoding information used for decoding the plurality of encoded image data series are saved;

an interface control circuit which performs data read/write operation from and to a memory area;

an encoding/decoding circuit which selectively performs encoding of image data of one series written into the memory area and decoding of encoded image data of one series; and a plurality of registers which provide an instruction of processing to the encoding/decoding circuit, wherein the encoding/decoding circuit performs encoding and decoding of image data of a plurality of series on a time division basis and in each series in accordance with the instruction from the plurality of registers.

16. A semiconductor device according to claim 15, wherein encoding information which is necessary for restarting next encoding processing is saved in the memory and the decoding information is supplied from the memory to the encoding/decoding circuit when the instruction is changed from an image series to an encoded image series.

* * * * *